Dec. 9, 1969  S. KNEMEYER  3,482,805
SYSTEM FOR STABILIZING THE COLLECTIVE CONTROL OF A HELICOPTER
OR THE CORRESPONDING CONTROL OF OTHER VTOL AIRCRAFT
Filed Nov. 14, 1967  2 Sheets-Sheet 2
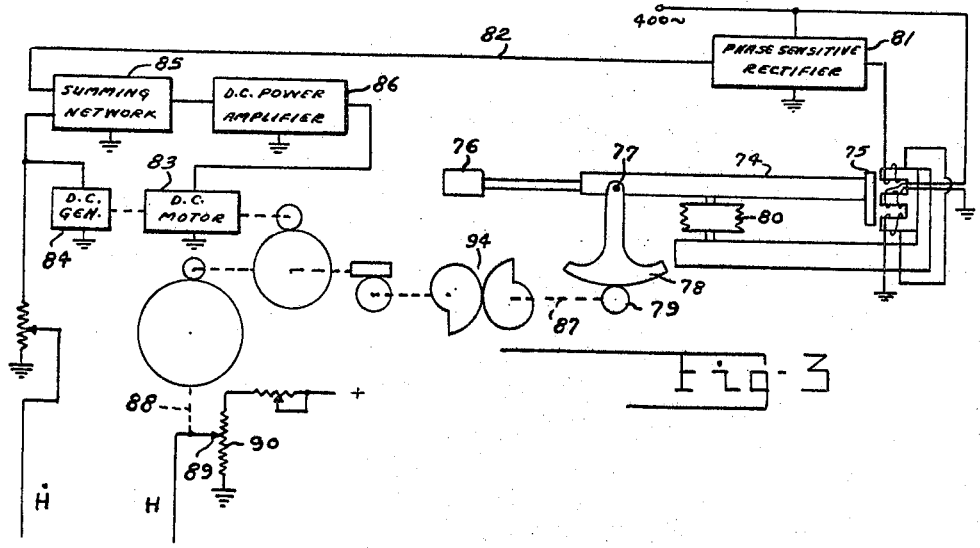
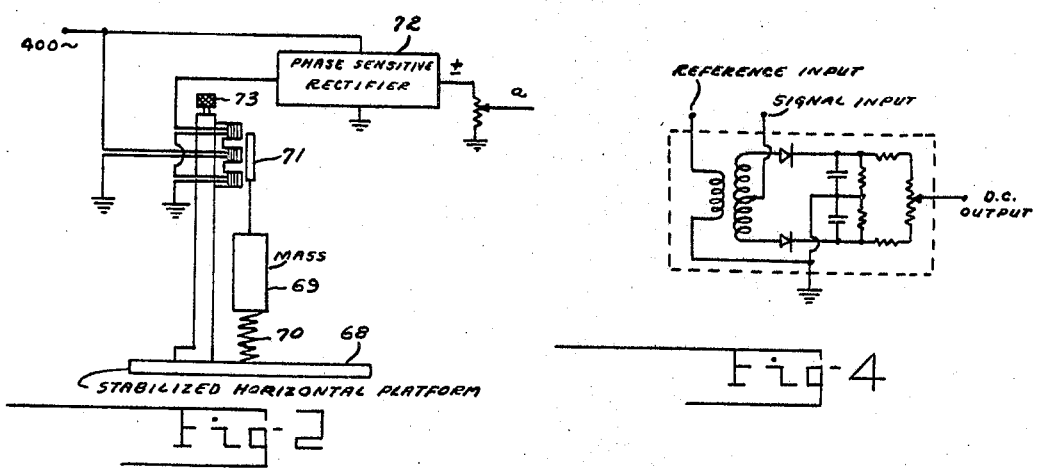
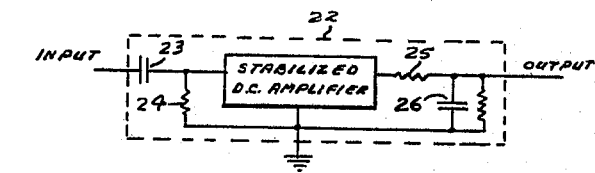
INVENTOR.
SIEGFRIED KNEMEYER
BY Harry A. Herbert Jr.
ATTORNEY
James P. Shannon
AGENT

United States Patent Office 3,482,805
Patented Dec. 9, 1969

3,482,805
SYSTEM FOR STABILIZING THE COLLECTIVE CONTROL OF A HELICOPTER OR THE CORRESPONDING CONTROL OF OTHER VTOL AIRCRAFT
Siegfried Knemeyer, P.O. Box 123, Yellow Springs, Ohio 45387
Filed Nov. 14, 1967, Ser. No. 683,437
Int. Cl. B64c 13/50, 19/00
U.S. Cl. 244—77                                  5 Claims

ABSTRACT OF THE DISCLOSURE

A system which senses the up or down force applied by the pilot to the regular manual vertical thrust control lever of a helicopter or other VTOL aircraft and produces an up or down vertical acceleration proportional to the force and for as long as the force is applied. When the force is removed, the system stabilizes the vertical rate of climb or descent at the rate the aircraft had at the instant the force was removed. In addition, whenever the rate of climb or descent is less than a preset low value near zero and pilot force is removed from the control lever, the aircraft is stabilized in altitude at the altitude it had at the instant the force was removed.

BACKGROUND OF THE INVENTION

The invention relates to flight control systems and particularly to a pilot assisting system for controlling the movements of a helicopter or other VTOL (vertical take-off and landing) aircraft in the vertical direction.

Present stability augmentation systems for the collective pitch control of helicopters or the equivalent vertical thrust control of other VTOL aircraft can not discriminate between pilot induced maneuvers and externally induced disturbances. This results in the stability augmentation system opposing any control input which the pilot may introduce through the primary manual vertical thrust control of the aircraft. In present fully automatic flight control systems, the pilot can not introduce commands through the primary manual controls at all, but only through the autopilot controls which are separate and distinct from the manual controls. As a result, maneuverability is greatly reduced. Further, present vertical stabilization systems do not provide for precisely stabilizing the aircraft on an existing rate of climb or descent, for changing the rate of climb or descent, or for automatic altitude hold when a rate of climb or descent close to zero has been established, with all of these capabilities being controlled entirely by actuation of the primary vertical control lever.

SUMMARY OF THE INVENTION

The purpose of the invention is to provide a flight stabilization system which may be applied to the collective control system of a helicopter or to the equivalent vertical control of other VTOL aircraft and which in effect includes the pilot as an integral part of the system in that all pilot inputs to the control system are made through the primary manual control lever as in manual flight so that the pilot is in full command and capable of instant maneuver the same as he would be in manual flight. Further objects are to provide a system capable of stabilizing the rate of climb or descent, of changing the stabilized rates to new stabilized rates, and of automatic altitude hold when a rate of climb or descent close to zero has been established.

Briefly, the above is accomplished by producing a signal proportional to the force applied by the pilot to the vertical control lever, which signal is used as a control signal for a servomechanism coupled to the vertical thrust control mechanism of the aircraft to produce a rate of climb or descent proportional to the force. Signals proportional to the instantaneous rate of climb or descent and to the instantaneous altitude are produced. At the instant force is removed from the control lever, the rate of climb or descent existing at that moment is stored and a signal proportional to the difference between the actual rate and the stored rate is applied to the servomechanism to stabilize the aircraft at the stored rate. Provision is also made that whenever a rate of climb or descent below a preset minimum value close to zero has been established, removal of force from the control lever causes the altitude at that instant to be stored and a signal proportional to the difference between the actual altitude and the stored value, together with a signal proportional to the instantaneous rate of climb or descent, are applied to the servomechanism to stabilize the altitude of the aircraft at the stored altitude.

BRIEF DESCRIPTION OF THE DRAWINGS

FIG. 2 illustrates a type of vertical accelerometer that may be used in FIG. 1;

FIG. 3 illustrates a type of altitude transducer that may be used in FIG. 1;

FIG. 4 illustrates a type of phase sensitive rectifier that may be used in FIG. 1; and FIG. 5 illustrates a type of washout circuit that may be used in FIG. 1.

PREFERRED EMBODIMENT OF THE INVENTION

Figure 1:
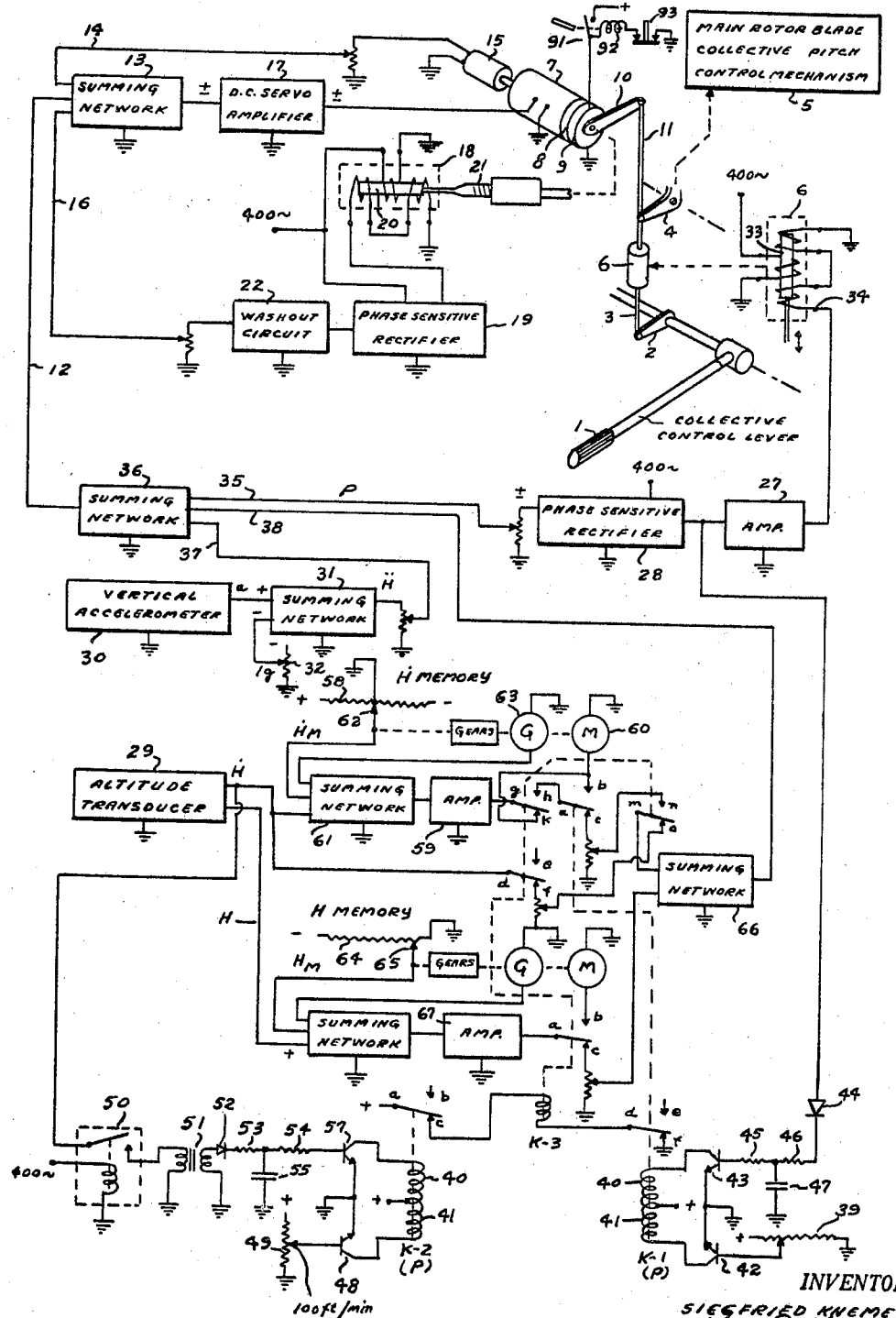
FIG. 1 is a diagram of one embodiment of a complete control system in accordance with the invention.

A schematic diagram of the invention as applied to the collective control of a helicopter is shown in FIG. 1. A brief description of the primary manual flight controls of a helicopter is given in my application Ser. No. 683,436 filed Nov. 14, 1967. The collective control, with which this invention is concerned, controls the vertical movements of the helicopter, i.e., the rate of climb or descent. The pilot's input to this control is through the collective lever 1 which operates through crank arm 2, push rod 3, and crank arm 4 to actuate the main rotor blade collective pitch control mechanism 5. The mechanical design of this mechanism is not part of the invention and need not be explained for the invention to be understood. Its function is to vary the pitch of all of the main rotor blades in the same direction and to the same degree, thereby changing the magnitude of the thrust of the main rotor without changing the direction of the thrust. The main rotor operates at constant speed. Force sensor 6, to be explained later, does not interfere in any way with the manual operation of the collective mechanism.

Pilot assist in the operation of the mechanism 5 is provide by D.C. servomotor 7 which operates through an integral reduction gear (not shown), override clutch 8, electromagnetic engage clutch 9, crank arm 10, and link 11 to drive input crank arm 4. The servomotor 7 operates in parallel to the manual control. A series acting servomotor energized along with motor 7 and inserted in series with the linkage at an appropriate point beyond crank 4 may be used in addition to motor 7 if desired. This practice is well known in the art but is not illustrated for simplicity. Motor 7 is part of a servomechanism which operates in response to a D.C. servo control signal on line 1'2 to cause motor 7 to run at a speed proportional to the magnitude of the signal and in a direction determined by the polarity of the control signal. Summing network 13 produces the algebraic sum of the control signal and two negative feedback signals, one on line 14 which is proportional to the speed of motor 7 and derived from D.C. tachometer 15, and the other on line 16 which is a function of the angular position of arm 10 measured from its neutral position. The magnitude of the input signal to servo amplifier 17 therefore equals the difference between the control signal on line 12 and the sum of the two negative feedback signals. The position feedback signal is derived from a circuit including an A.C. linear position transducer 18, such as a differential transformer on the equivalent, phase sensitive rectifier 19 and washout circuit 22. Transducer 18 produces and A.C. signal proportional to the angular displacement of arm 10 from its neutral position and having a phase difference relative to the reference phase of the A.C. energization of 0° or 180° depending upon the direction of the displacement. The linear movement of magnetic element 20 of transducer 18 is made proportional to the angular movement of arm 10 by screw 21. Phase sensitive rectifier 19 converts the A.C. output of the transducer to a proportionate D.C. signal with polarity corresponding to the phase of the A.C. signal. A suitable phase sensitive rectifier is shown in FIG. 4. The washout circuit 22 produces an output signal proportional to the time integral of the rate of change of its input signal, with provision for the output signal to decay to zero in a short interval after the input ceases to change. A suitable embodiment is shown in FIG. 5, in which elements 23–24 form a differentiating network and elements 25–26 an integrating network. The rate at which the output signal decays is determined by the size of capacitor 26 and the total shunt resistance. The effect of the feedback on line 14 is to cause motor 7 to run at a speed proportional to the control signal magnitude; the effect of the position feedback is to provide rapid movement in the early part of an operation with an increased negative feedback toward the end to reduce overshoot. The design of the above-described servomechanism follows established practice and is not considered part of the invention.

The collective stabilizing system constituting the invention, and shown in the remainder of FIG. 1, operates in response to pilot applied force to collective control lever 1 to establish a vertical acceleration directly related to the force and, upon release of the force, to automatically maintain the rate of climb or descent that the helicopter had at the time the force was released. The rate of climb or descent can be increased or decreased at any time by applying further force to the collective lever in the proper direction. Whenever the rate of climb or descent has been reduced below a preset small value, for example, 100 feet per minute, or, for any reason, is below this small rate, release of force on the collective lever causes the system to stabilize the altitude of the helicopter at the value it had at the instant force was released.

The following primary control signals are employed in the system of FIG. 1:

P—A bipolar D.C. signal proportional to the force applied by the pilot to the collective lever, the polarity indicating the direction of the force. Produced by combined action of elements 6, 27 and 28.

H—A unipolar D.C. signal representing the altitude of the helicopter above ground. Produced by altitude transducer 29.

$\dot{H}$—A bipolar D.C. signal representing the rate of change of H, or the rate of climb or descent. Polarity determined by whether altitude is increasing or decreasing. Produced by altitude transducer 29.

a—A D.C. signal representing the total acceleration of the helicopter. Normally unipolar, it would change sign only for a downward acceleration greater than one g.

$\ddot{H}$—A bipolar signal representing the effective vertical acceleration of the helicopter. Its value is $a-g$ derived at summing network 31.

For a helicopter in flight, the following equation holds:

$$L = M_h \ddot{H} + M_h g$$
$$= M_h(\ddot{H}+g)$$
$$= M_h a$$

where

L=vertical thrust of main rotor
$M_h$=mass of helicopter
"a" and $\ddot{H}$=the total and effective accelerations as defined above.

The pilot exercises his control over the collective stabilization system entirely through the regular manual collective control lever 1. Any force applied to the lever is sensed by force sensor 6, a suitable design for which is disclosed in detail in my application referenced above. The transducing element in the sensor is essentially a differential transformer, as shown, in which compressive and tensional forces applied to it move magnetic element 33 in opposite directions relative to the windings. In the zero force position of this element, equal coupling exists between the energized primary winding and each of two secondary windings which are connected in series in phase opposition. Consequently, for zero force, there is no output at terminal 34. When a force is applied, the coupling to one of the secondaries predominates producing a net output at terminal 34 proportional in amplitude to the force and in phase with or in phase opposition to the primary energization depending upon the direction of the force applied to the collective control lever. This signal, after amplification in amplifier 27, is converted to a proportionate D.C. pilot force signal P, defined above, in which the polarity conveys the directional information, by phase sensitive rectifier 28 (FIG. 4).

The operation of the collective stabilization system of FIG. 1 will be described starting with the helicopter resting on the ground prior to take off with no force applied to the collective control lever 1. Under these conditions, the signal P on input 35 to summing network 36 is zero since there is no force on stick 1; the signal $\ddot{H}$ on input line 37 is zero since "$a$"=$g$; and the signal on input line 38 is zero. The last statement requires further explanation, as follows:

The contacts a—c and d—f of relay K–1 are closed whenever the force exerted by the pilot on lever 1 in either direction is below a preset small breakout value, which is determined by the setting of potentiometer 39. K–1 is a polarized relay having coils 40 and 41 which produce opposing fluxes. When the current in coil 41 predominates, contacts a—c and d—f are closed and when the current in coil 40 predominates contacts a—b and d—e are closed. The current in coil 41 is controlled by the preset breakout potential applied to the base of transistor 42 from potentiometer 39. The current in coil 40 is controlled by the force applied to lever 1 which controls the potential applied to the base of transistor 43. Any force on lever 1 which produces an output from force sensor 6 exceeding the built-in "noise" threshold of amplifier 27 results in an output from this amplifier which is rectified by diode 44 to produce a direct voltage proportional to the absolute magnitude of the output, which in turn is applied to the base of transistor 43 through time constant network 45–46–47. Therefore, when the pilot applied force is less than the breakout value preset at potentiometer 39 contacts a—c and d—f are closed and when greater contacts a—b are closed and contacts d—f open. Relay K–2 is identical to relay K–1 except that it is controlled in accordance with the absolute value of $\dot{H}$, from altitude transducer 29, and a preset small vertical rate, such as 100 feet per minute, represented by the potential applied to the base of transistor 48 from potentiometer 49. For controlling K–2, the absolute value of H is derived by a chopper 50 and transformer 51, which convert the D.C. signal to an A.C.

signal, and rectifier 52 which, together with filtering and time constant circuit 53–54–55, produce a positive direct potential on the base of transistor 57 proportional to the absolute value of $\dot{H}$. Thus, when $\dot{H}$ is less than 100 ft./min. contacts a—c of K–2 are closed and when greater contacts a—c are open. In the above-stated condition of the helicopter, contacts a—c and d—f of K–1 are closed and contacts a—c of K–2 are closed, since the pilot force is zero and $\dot{H}$ is zero.

The $\dot{H}$ and H memories will now be explained. The $\dot{H}$ memory is a potentiometer 58, the grounded center of which corresponds to $\dot{H}=0$ and the oppositely poled extremities of which represent maximum rate of climb and maximum rate of descent. The polarities of $\dot{H}$ as produced by altitude transducer 29 are opposite for rate of climb and rate of descent. If the output of amplifier 59 is coupled to motor 60, either through contacts g—h of K–3 and a—b of K–1 or through contacts g—k of K–3, and if the helicopter has a vertical velocity, the resulting $\dot{H}$ signal is applied through summing network 61 to the input of amplifier 59 causing motor 60 to run and drive contact 62 along the potentiometer. The arrangement is such the contact 62 is driven toward that side of the potentiometer that has the polarity opposite to the polarity of $\dot{H}$. This produces a feedback voltage to the input of summing network 61 of opposite sign to the $\dot{H}$ voltage. The third input to the summing network is a negative feedback proportional to the speed of motor M and derived from D.C. generator 63. Network 61 produces the algebraic sum of these three signals which serves as the input signal for amplifier 59. With sufficient gain in the amplifier, this signal causes motor 60 to run as required to maintain the potential $\dot{H}_M$ at contact 62 in equality with $\dot{H}$ and opposite in polarity.

The H memory is an adjustable potentiometer and servo arrangement similar to the $\dot{H}$ memory for keeping the potential $H_M$ at adjustable point 65 on potentiometer 64 in equality with H whenever normally closed contacts a—b of K–3 are closed. The operations of the two systems are the same except that the two signals in the H case are unipolar.

Relay K–3 is normally spring biased upward. Therefore, the contacts a—b, d—e, g—h and m—n of this relay are normally closed. However, for the specified initial conditions, $\dot{H}=0$ causing contacts a—c of K–2 to be closed and, since the control lever force is zero, contacts d—f of K–1 are also closed. Therefore K–3 is energized, causing all of its normally open contacts to be closed, as shown in the drawing. Since $\dot{H}=0$, the input to summing network 66 through contacts d—f and m—o of K–3 is zero. Further, since H and $H_M$ are zero, their difference applied through amplifier 67 and contacts a—c of K–3 to summing network 66 is zero. Consequently, the input signal to summing network 36 on line 38 is zero.

To take off, the pilot applies upward force to the collective lever 1 which produces a proportionate D.C. signal P on line 35 of polarity representative of the force direction. This signal is applied through summing network 36 to line 12 as a control signal to the pitch control servomechanism causing servomotor 7 to run at proportionate speed and in the proper direction to increase the blade pitch at a rate proportional to the force applied to the lever. This produces an increasing lift which first overcomes the weight of the helicopter and then gives it an increasing upward acceleration.

Accelerometer 30 produces a D.C. output signal "a" proportional to the total vertical acceleration. On the gravity g. This signal is algebraically added to a constant D.C. signal of opposite sign and proportional to the acceleration of gravity g, derived from potentiometer 32, to produce the effective acceleration signal $\ddot{H}$ which is zero when the helicopter is on the ground. The vertical acceleration of the helicopter gives rise to an increasing $\ddot{H}$ which is applied to input 37 of summing network 36 with opposite polarity to P so that the servo control signal on line 12 is now P−$\ddot{H}$. The acceleration continues to increase until $\ddot{H}$ substantially equals P where it stabilizes. Therefore the acceleration produced is proportional to the force applied to the collective lever 1.

The force applied to the lever caused contacts a—b of K–1 to close, as previously explained, connecting amplifier 59 to motor 60 through normally closed contacts g—h of K–3, this relay having been de-energized by the opening of contacts d—f of K–1. The upward acceleration gives rise to an increasing rate of climb $\dot{H}$ which is followed by contact 62 of the $\dot{H}$ memory, as already explained. Moreover, the upward acceleration increases altitude, giving rise to an H signal which, since contacts a—b of K–3 are now closed, is followed by contact 65 of the H memory, as already explained.

When the rate of climb has reached a desired value greater than the above preset low value of 100 ft./min. the pilot may stabilize the climb of the helicopter at this rate by releasing the force applied to the collective control lever. This reduces P to zero, closes contacts a—c of K–1, and opens contacts a—b of K–1 stopping contact 62 of the $\dot{H}$ memory on the rate of climb at the instant force was removed from the lever. The difference, initially zero, between the actual rate of climb signal $\dot{H}$ and the rate of climb signal $\dot{H}_M$ stored in the memory is applied through amplifier 59, normally closed contacts g—h of K–3, which remains de-energized since $\dot{H}>100$ ft./min., contacts a—c of K–1, normally closed contacts m—n of K3, summing network 66, and summing network 36 to the input of the blade pitch controlling servomechanism. The result is to hold $\dot{H}$ in equality with $\dot{H}_M$. At the same time the contact 65 continues to follow the increasing value of H as the altitude increases since normally closed contacts a—b or K–3 are closed.

If the pilot again applies upward pressure to the collective lever a further increase in main rotor blade pitch occurs producing an increased upward thrust. This product a further upward acceleration and increasing rate of climb in exactly the same manner as described above. If downward pressure is applied to the lever, the sign of P changes, which reduces the main rotor blade pitch and the main rotor thrust. If there is an upward acceleration at this time it is reduced at a rate proportional to the force and the value of $\ddot{H}$ reduces without changing sign. If the vertical acceleration is zero, or, if initially upward, has been reduced to zero by the downward pressure on the control lever, a downward acceleration is produced proportional to the applied force, $\ddot{H}$ in this case changing sign. Variations in rate during descent and changes from descent to climb are accomplished in a similar manner.

During the above actions, all of the time during which the force applied to the collective lever exceeds the breakout value, the potentials $\dot{H}_M$ and $H_M$ in the corresponding memories follow the values of $\dot{H}$ and H, or the actual rate of decline or descent and the actual altitude of the aircraft. This is insured by the contacts d—f of K–1 which act as an interlock to prevent the energization K–3 when force is applied to the control lever, even though contacts a—c of K–2 may close due to the rate of climb or descent falling below 100 ft./min.

If at any time the rate of climb or descent is brought below 100 ft./min., or other preset low value, and the pilot applied force to the collective control lever is removed, relay K–3 is energized through contacts a—c of K–2 and contacts d—f of K–1. The opening of contacts a—b of K–3 causes the contact 65 on the H memory potentiometer to stop at a potential $H_M$ equal to the value of H at the time the force was removed. The closing of contacts a—c of K–3 causes the signal at the output of amplifier 67, which is proportional to the difference, initially zero, between H and $H_M$ to be applied to one input of summing network 66. The closing of contacts d—f of K–3 causes the signal $\dot{H}$, at the output of altitude transducer 29, to be applied through now closed contacts m—o of K–3 to the other input of summing network 66. The output of network 66, consisting of $\dot{H}$ and the $H—H_M$ signals, is applied through summing network 36 to the input of the main rotor blade pitch control servomechanism. This causes the blade pitch to be controlled in such manner as to maintain equality between the signals H and $H_M$ or in effect to maintain the altitude of the helicopter at the altitude it had at the instant force was removed from the collective lever. The presence of the $\dot{H}$ term in the control signal insures that the rate of any altitude correction will be proportional to the error.

The electromechanical clutch 9 for coupling servomotor 7 to the pitch control mechanism is engaged by manually closing switch 91, which is then held closed by holding coil 92. The clutch may be released at any time by means of normally closed push button 93 which breaks the holding circuit. The push button is placed where it can be instantly actuated by the pilot. Override clutch 8 is a required safety feature which permits the pitch control mechanism to be operated manually by supplying sufficient force to lever 1 should clutch 9 fail to release for any reason.

The summing networks used in the system may be of any type capable of producing the algebraic sum of applied D.C. signals of either polarity. A suitable type is shown in FIG. 2.21(b) on page 2–9 of Computer Handbook, Huskey and Korn, McGraw-Hill, 1962.

Vertical accelerometers capable of producing the signal "a" proportional to the total acceleration, and altitude transducers capable of producing the signals $\dot{H}$ and H are available commercially in several designs. FIGS. 2 and 3 illustrate the principles involved.

Referring to FIG. 2, the vertical accelerometer is mounted on a stabilized horizontal platform 68 and comprises a mass 69 supported by resilient means such as spring 70. Attached to the mass is the moving magnetic element 71 of an E-type pickoff which is a type of differential transformer operating on the same principle as transformers 6 and 18 in FIG. 1. The A.C. output of the E pickoff is converted to a D.C. signal by phase sensitive rectifier 72 (FIG. 4). Acceleration causes element 71 to move relative to the E core varying the transformer output and the value of the output signal "a." With the accelerometer resting on the earth, the position of he E core is adjusted, as by screw 73, to produce an output "a" equal to one g to a suitable scale. Upward acceleration increases "a." Downward acceleration decreases "a" causing it to change sign when it passes through zero.

The altitude transducer shown in FIG. 3 is of the barometric type. A bar 74, carrying the movable element 75 of an E-type pickoff at one end and balanced by counterweight 76 at the other, is pivoted on a torsion rod 77 having sectors 78 at each end driven by pinions 79, only one pair of which can be seen in FIG. 3. Bellows 80, which is subjected to static atmospheric presure, tends to rotate bar 74 about the axis of the torsion bar 77 with changes in atmospheric pressure, producing an A.C. error signal from the E pickoff. The A.C. error signal is converted to a D.C. error signal by phase sensitive rectifier 81 (FIG. 4) which is applied over line 82 to a servo loop comprising D.C. motor 83, D.C. rate generator 84, summing network 85, and power amplifier 86. With this arrangement a slight movement of element 75 causes motor 83, coupled through a gear train to pinions 79, to tension the torsion bar 77 through sector 78 in such direction as to oppose the movement of element 75. With sufficient gain in servo amplifier 86, element 75 can be held within a very narrow range about its central position so that the tension in the torsion bars and, therefore, the rotation of shaft 87 are measures of atmospheric pressure relative to a predetermined reference pressure. Exponential cams 94 convert this rotation to altitude at the other shafts including shaft 88 which moves a potentiometer conact 89 along a potentiometer resistor 90. As a result, the voltage at contact 89 is an analog of the altitude H. Since the speed of D.C. generator 84 is proportional to the rate at which contact 89 moves, its output voltage is proportional to the rate of change of altitude, or $\dot{H}$. A quicker acting $\dot{H}$ signal generator in which a barometrically derived rate is combined with the integrated vertical acceleration in a complementary filter is described in U. S. Patent No. 3,276,255 to Hattendorf.

The specific embodiment of the invention described above and in the drawings is for illustrative purposes only. The control system may be constructed using any of the known elements and techniques of the servomechanism art that are capable of performing the functions specified for the system shown. For example, the system could be a basically a.c. system rather than the basically D.C. system shown, or it couud be entirely nonelectrical using hydraulic or fluid techniques.

I claim:
1. In combination with an aircraft capable of vertical takeoff and landing and having a vertical thrust control mechanism actuatable by the pilot through a manual control lever linked to the thrust control mechanism: a servomechanism coupled to said thrust control mechanism and having a control signal input, said servomechanism operating in response to a control signal applied to its input to actuate the thrust control mechanism at a rate proportional to the magnitude of the applied control signal and in the direction specified by the control signal; a force sensor in the linkage between said control lever and said thrust control mechanism for producing a signal P proportional to the force applied to said lever and indicative of the force direction; means for producing a signal $\ddot{H}$ proportional to the effective vertical acceleration of the aircraft; and means for applying a signal proportional to the difference between P and $\ddot{H}$ to the input of said servomechanism for producing a vertical acceleration of the aircraft proportional to P and in the direction indicated by P.

2. Apparatus as claimed in claim 1, and in addition: means for producing a signal $\dot{H}$ proportional to the vertical velocity of the aircraft and indicative of the direction of the velocity; rate memory means receiving $\dot{H}$ as an input for producing a signal $\dot{H}_M$ equal to the instantaneous value of $\dot{H}$ and indicative of the velocity direction; and means responsive to removal of force from the control lever for fixing $\dot{H}_M$ at the avlue it had at the instant the force was removed and for applying, during the absence of said force, a signal to the input of said servomechanism proportional to the difference between the instantaneous value of $\dot{H}$ and the fixed value of $\dot{H}_M$ for stabilizing the vertical velocity of the aircraft at the value it had at the instant force was removed from the lever.

3. Apparatus as claimed in claim 1, and in addition: means for producing a signal $\dot{H}$ proportional to the vertical velocity of the aircraft and indicative of the direction of the velocity; means producing a signal H proportional to the altitude of the aircraft; altitude memory means receiving H as an input for producing a signal $H_M$ equal to the instantaneous value of H; and means receiving a signal proportional to the absolute value of $\dot{H}$ as an input and, provided said signal is below a preset value corresponding to a low vertical velocity near zero, responsive to removal of force from said lever for fixing $H_M$ at the value it had at the instant the force was removed, and for applying, during the absence of said force, a signal to the input of said servomechanism proportional to the difference between the instantaneous value of H and the fixed value of $H_M$ and also a signal proportional to $\dot{H}$, for stabilizing the altitude of the aircraft at the altitude it had at the instant said force was removed.

4. Apparatus as claimed in claim 2, and in addition: means producing a signal H proportional to the altitude of the aircraft; altitude memory means receiving H as an input for producing a signal $H_M$ equal to the instantaneous value of H; and means receiving a signal proportional to the absolute value of $\dot{H}$ as an input and, provided said signal is below a preset value corresponding to a low vertical velocity near zero, responsive to removal of force from said lever for fixing $H_M$ at the value it had at the instant the force was removed, and for applying, during the absence of said force, a signal to the input of said servomechanism proportional to the difference between the instantaneous value of H and the fixed value of $H_M$ and also a signal proportional to $\dot{H}$, for stabilizing the altitude of the aircraft at the altitude it had at the instant said force was removed.

5. Apparatus as claimed in claim 4 in which said last-named means also operates, in response to removal of force from said lever, to re-establish, at said rate memory, equality between $\dot{H}_M$ and $\dot{H}$.

References Cited

UNITED STATES PATENTS

| | | | |
|---|---|---|---|
| 2,945,649 | 7/1960 | Metcalf et al. | 244—77 |
| 3,033,496 | 5/1962 | Brands | 244—77 |
| 3,071,335 | 1/1963 | Carter | 244—77 |

FERGUS S. MIDDLETON, Primary Examiner

U.S. Cl. X.R.

170—160.13; 244—17.13